March 6, 1934.  L. WYLIE ET AL  1,949,441
METHOD AND MEANS OF LUBRICATION
Filed March 2, 1932

Inventors
J. V. Lamson
L. Wylie
By
Attorney

Patented Mar. 6, 1934

1,949,441

UNITED STATES PATENT OFFICE 1,949,441

METHOD AND MEANS OF LUBRICATION

Laurence Wylie and Joseph V. Lamson, Seattle, Wash.

Application March 2, 1932, Serial No. 596,388

8 Claims. (Cl. 191—55)

This invention is directed to a method of and means for lubricating the contact surface of trolley wires and the moving current collector cooperating with such wires.

The continued growth of railroad electrification in practically all countries has directed the attention of investigators to various details of such electrification, seeking not only to improve the service but to reduce the necessity and costs of repair and replacements. In such electrification, the practically universal delivery of the current to the train equipment is through the medium of overhead trolley wires carrying the current to collectors carried by the train equipment which move in contact with the wires. Obviously, the cooperation of the collector and wires must be under sufficient pressure to maintain good electrical contact, and incident to such pressure, the wear on the wires and collector shoes or collector strips forming part of said shoes is inescapable and forms no inconsiderable part of the repair and replacement costs incident to maintaining effective operation.

It has been heretofore proposed to provide for lubricating the contact between the collector and trolley wires with a view to minimizing the friction, and thereby the wear, and this problem of effective lubrication has, so far as known, not been satisfactorily solved up to the present. It was early recognized that an ideal lubricating element for the purpose was graphite in one or the other of its several forms. In the best accepted known types of this lubrication, the graphite in flake or powder form was mixed with grease and placed on the collector periodically, say at the terminals of the run of the particular locomotive. This method of lubrication, however, presented several distinctive disadvantages which, while fully recognized, were nevertheless considered to be a necessary defect to be suffered in order that the advantages of some lubrication might be had.

In the grease-graphite compound applied to the collectors, the grease acted primarily as a vehicle for the carrying of graphite, and owing to the unstable character of the grease, it has been found that the lubricant was gradually lost from the collector during the run, with the effect that the lubrication of the collector at the respective ends of the run where the lubricant was freshly applied was more or less effective and satisfactory, while in the intermediate portions of the run the lubricating effect, while still present, was so reduced as to cause very material and unnecessary wear upon the contact strips of the collector and upon the trolley wires. Furthermore, the grease in falling from the collector dropped onto the locomotive, collected on the roadbed, and required an unnecessary cleaning of the locomotive and parts, to say nothing of the continued loss of the lubricant.

The present invention is directed to a method and means for lubricating collector shoes in which the lubricant will remain with full effect substantially throughout the life of the renewable contact strips on the collector and in which the lubricant is so applied to the collector as to avoid any material probability that the lubricant will be displaced from the collector.

The invention further contemplates the use of a lubricant and a method of its application to the collector as to insure a smoothing and polishing of the trolley wire and contact strips, with a consequent reduction in friction between the parts and an insuring of the most effective electrical contact.

In carrying out the method of the present invention, the space between the contact strips on the collector is provided with graphite lubricant in the shape of a graphite cement which, prior to use, is permitted to become solid and comparatively hard to present a non-flaking lubricant body. In the specific development of the method as outlined in the following specification, the space between the contact strips on the collector is provided with a reticulated metallic reinforce in the form of a screen. The graphitic cement is applied to the space between the strips to include the screen and then permitted to harden, either in the air or with the application of heat, for an appreciable period. The surface of the lubricant after hardening is, if necessary, sandpapered or otherwise treated so that such surface is on an exact level with or in the plane of the upper surface of the contact strips of the collector. The collector is thus supplied in the space between the edge contact strips with a solid, relatively hard mass of lubricant substantially reinforced against material flaking or breaking apart.

For a more detailed explanation of the method and as a conventional means for collector lubrication in accordance with the method, reference is had to the accompanying drawing, in which:—

Figure 1:
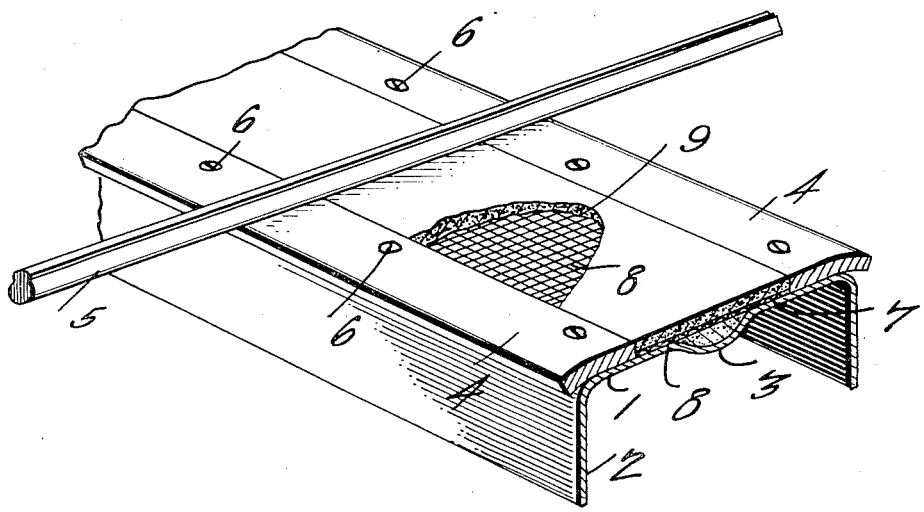
Figure 1 is a broken perspective of the improved collector with the lubricant in place.
Figure 2:
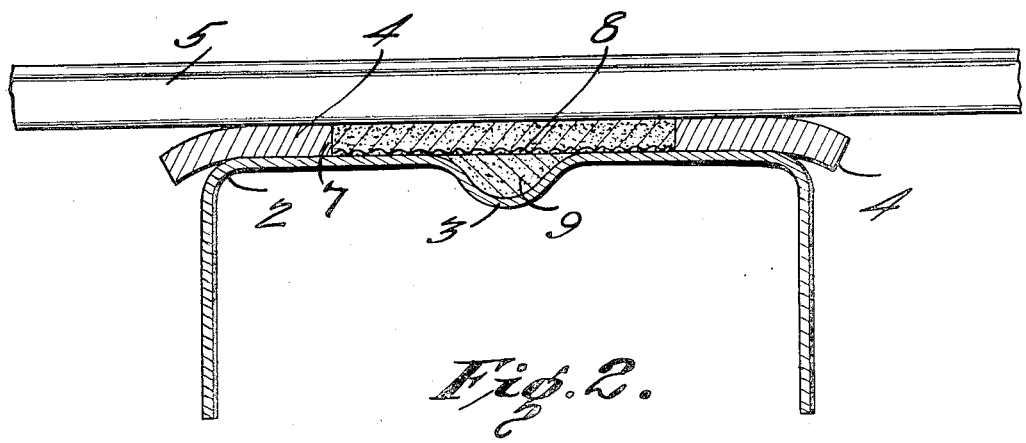
Figure 2 is a transverse section of the same.

The collector 1 is of conventional construction, and for the purpose of the present invention may be said to include a steel shoe 2 having a longitudinal central depression 3 and to the side edges of which are removably secured preferably copper contact strips 4. Of course, it is understood that the collector is supported on the usual extensible element, such as a pantograph or the like, and that the copper strips form the direct contact elements with the trolley wire or wires 5 and that these copper strips, being the element of the collector subjected to wear, are removably secured to the collector, as by screws 6, in order to provide for the renewal of these strips when worn, all of which is more or less conventional. As the contact strips 4 are secured to the edges of the shoe 2, there is an intermediate space 7 of appreciable depth between the relative proximate edges of the strips and above the shoe 2.

In carrying out the present method, a reticulated reinforcing member such, for example, as a screen 8 is secured by metallic connectors 9 to the shoe 2 to more or less completely occupy the space between the contact strips. The screen is secured to the shoe so that the upper surface of the screen is below the upper surface of the contact strips and, if desired and as preferred, the screen may be applied in direct contact with the upper surface of the shoe 2.

The lubricant employed in the present invention is then applied to the space between the contact strips, filling the interstices of the screen. The lubricant applied is preferably a graphite cement, the proportion of graphite in which is very large, the remaining requisites being that the lubricant must have properties of hardness, toughness, lack of shrinkage and resistance to moisture. A lubricant cement of this type is found on the market, and while for the sake of this disclosure it may be said that such type of lubricant is essentially fitted for use in connection with the present method and means, it is to be understood that any other suitable lubricant containing the necessary qualifications of an extremely large percentage of graphite and combining the essentials of hardness, toughness, lack of shrinkage and resistance to moisture is contemplated for use in connection with the present invention.

After the application of the lubricant to the space between the contact strips and to the screen and within the depression 3, the collector strip with the layer of lubricant applied is placed in a drying oven and subjected to a drying, hardening action for an appreciable period, say approximately five days, the heat being, of course, insufficient to affect the metal base or the metal contact strips. While the graphitic material may be applied as a single layer, and such is contemplated as an essential feature of the invention, it is nevertheless also contemplated that such graphitic materials be applied in two layers, the first of which may include the screen reinforces and be independently hardened, and following the hardening of such initial application, the second layer is applied, which is also hardened as described in connection with the first layer. After the graphitic material has been applied, either as a single layer or in two or more layers, each independently hardened, the surface is leveled off in any appropriate manner so that the surface of the graphitic material is in the plane of the upper surface of the contact strips.

The drawing accompanying the application illustrates the use of two layers of graphitic material, and while a clear demarcation has been shown between the layers to indicate the fact of such layers, it is to be understood that such illustration is also indicative of a single layer in place of the two layers and the description is to be accordingly understood. Furthermore, the hardening provision for the graphitic material here described as a more or less baking process may also be perfected by exposing the graphitic material to the atmosphere for an appreciable period, allowing a natural hardening of the graphitic material, which is effective for the purpose, though probably of less benefit commercially, as the air hardening requires a comparatively greater length of time.

In any event, after the application of the graphitic material, either in one or more layers, and the hardening thereof, either through exposure to the air or exposure to appropriate heat, the surface of the lubricant is, if necessary, reduced until such surface is in a true plane with the upper surface of the contact strips. It is an essential of the method and means that the lubricant between the contact strips must not be higher than the upper surface of the contact strips at any point.

The lubricant constitutes a relatively hard, more or less wear-resisting element as compared with the conventional grease and graphite lubricant, which wears with the contact strips and which, by very season of its maintaining its upper surface in the plane of the contact strips, insures a constant lubrication and in effect application of graphite to the trolley wires and through the trolley wires to the contact strips, maintaining these parts more or less polished and the running surfaces smooth and hard.

The present method of providing for the lubrication of collectors of this type presents features of material importance as compared with the conventional method of lubrication. In the first place, there is complete elimination of any grease content, thus avoiding the necessity of frequent application of the lubricant, overcoming the difficulty of ineffective lubrication between points at which the lubricant is ordinarily applied, and avoiding the disadvantage of the grease being displaced from the collector and falling onto parts of the locomotive or roadway. Further, the present lubrication maintains a uniform lubricating effect at all times because the lubricant is only worn in contact with the trolley wire and the graphite worn off through such contact is deposited on the running surfaces of the wires and by the wires on the contacting surfaces of the contact strips.

Again, the hard, smooth surface of the lubricant of the present invention will not collect sand and grit, in which particular it is distinguished from the usual grease-carrying lubricant, and by reason of which advantage the trolley wires and contact strips are not subjected to the wear incident to the presence of such sand or grit. The presence of the screen as a reinforce to the comparatively hard lubricating surface employed serves to prevent any possibility of the surface flaking or breaking away, due either to frost or to the jarring contact between the collector and wire in the initial placement or running of the collector. This avoids an undue waste of lubricant, heretofore an unavoidable incident to the previous methods of lubricating trolley collectors. The lubricant of the present invention, maintaining as it does at all times a contact with the trolley wires and by reason of the electrical conductivity of the graphite, assists in the transference of current and under all normal load conditions acts without sparking.

While the invention is described more particularly in connection with the provision of lubricants for collectors, it is understood that as a result of such there is a proper lubrication of the conductor element, that is, the trolley wire or third rail, and that this lubrication of these parts adds very materially to the effective life and inter-conductivity of these parts in use. Of course, the reference herein to collectors and trolley wires is intended to cover the essentials of an electric conductor and means for transferring the current from such conductor to a moving vehicle or other operative mechanism. Thus, the utilization of the invention in its application to the third rail and trolley shoes of conventional form and other electrical conductors and transferring elements is contemplated as within the spirit of the present invention and specifically intended to be covered by the general terms referred to herein.

The lubricant, by reason of the screen 8 and the adherence of its particles incident to the hardening step, will be effectively maintained in position during the travel of the collector.

We claim:—

1. A method of lubrication for trolley wires and collectors of the type including spaced contact strips consisting in applying solid graphite lubricant between the strips and baking it in place.

2. A method of lubrication for trolley wires and collectors of the type including spaced contact strips consisting in applying solid graphite lubricant between the strips and hardening it in place.

3. A method of lubricating for trolley wires and collectors of the type including spaced contact strips consisting in applying graphite lubricant in the space between the strips in independent layers and hardening each layer in place.

4. A method of lubricating for trolley wires and collectors of the type including spaced contact strips consisting in applying a layer of graphite in the space between the strips, metallically reinforcing the layer against separation, and hardening the layer in place.

5. A method of lubricating for trolley wires and collectors of the type including spaced contact strips consisting in applying a layer of graphite in the space between the strips, metallically reinforcing the layer against separation, baking the layer in place, then applying a second layer on the surface of the first layer, with such second layer having its upper surface in the plane of the upper surface of the contact strip, and baking said second layer in place.

6. A collector for trolley wires of the type including spaced contact strips including a layer of graphite lubricant arranged in the space between the contact strips and baked in place.

7. A collector for trolley wires of the type including spaced contact strips including a metallic reinforce secured to the collector between the contact strips, a layer of graphite applied to such reinforce and baked in place, and a second layer of lubricant applied to the first layer and baked in place.

8. A collector for trolley wires having spaced contact strips, a screen secured in the space between the strips and below the upper surface of the strips, a layer of graphite lubricant applied to the screen and baked in place, a second layer applied to the first layer and baked in place, the upper surface of the second layer being in the plane of the upper surface of the contact strips.

LAURENCE WYLIE.
JOSEPH V. LAMSON. [L. S.]